United States Patent
Kitagawa (10) Patent No.: US 12,212,189 B2
(45) Date of Patent: Jan. 28, 2025

(54) ROTATING ELECTRICAL MACHINE

(71) Applicant: Mitsubishi Electric Corporation, Tokyo (JP)

(72) Inventor: Yutaro Kitagawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 178 days.

(21) Appl. No.: 18/013,260

(22) PCT Filed: Jul. 31, 2020

(86) PCT No.: PCT/JP2020/029492
§ 371 (c)(1),
(2) Date: Dec. 28, 2022

(87) PCT Pub. No.: WO2022/024365
PCT Pub. Date: Feb. 3, 2022

(65) Prior Publication Data
US 2023/0261550 A1    Aug. 17, 2023

(51) Int. Cl.
| | |
|---|---|
| *H02K 11/01* | (2016.01) |
| *H02K 7/00* | (2006.01) |
| *H02K 7/08* | (2006.01) |
| *H02K 9/14* | (2006.01) |
| *H02K 9/19* | (2006.01) |
| *H02K 9/193* | (2006.01) |

(52) U.S. Cl.
CPC .......... *H02K 11/014* (2020.08); *H02K 7/003* (2013.01); *H02K 7/083* (2013.01); *H02K 9/193* (2013.01)

(58) Field of Classification Search
CPC ........ H02K 11/014; H02K 11/01; H02K 5/16; H02K 5/173; H02K 5/1732; H02K 7/08; H02K 7/083; H02K 21/14; H02K 9/14; H02K 9/19; H02K 9/193; H02K 9/12
See application file for complete search history.

(56) References Cited

U.S. PATENT DOCUMENTS 5,019,733 A * 5/1991 Kano ............. H02K 9/19
310/58
5,821,652 A * 10/1998 Hyypio ............. H02K 11/0141
310/83

(Continued)

FOREIGN PATENT DOCUMENTS

| CN | 107005120 A * | 8/2017 | .......... H02K 11/014 |
| DE | 102013219186 A1 * | 3/2015 | ............. H01R 39/12 |

(Continued)

OTHER PUBLICATIONS

International Search Report and Written Opinion mailed on Oct. 13, 2020, received for PCT Application PCT/JP2020/029492, filed on Jul. 31, 2020, 11 pages including English Translation.

*Primary Examiner* — Edgardo San Martin
(74) *Attorney, Agent, or Firm* — XSENSUS LLP (57) ABSTRACT

There are provided: a rotor including a rotating shaft and a rotor core; a stator including a stator core and stator windings; bearings; a casing fixed to the stator core and connected to the bearings, which houses the rotor and the stator; and an electrostatic shield connected to the casing. The electrostatic shield has a plurality of opening holes by which a space in which the stator is disposed is communicated with a space in which the rotor is disposed.

8 Claims, 10 Drawing Sheets

(56) References Cited

U.S. PATENT DOCUMENTS

| | | | |
|---|---|---|---|
| 6,359,350 B1 * | 3/2002 | Kaiho | H02K 9/12 |
| | | | 310/59 |
| 10,547,226 B2 * | 1/2020 | Heidler | H02K 3/42 |
| 11,962,218 B2 * | 4/2024 | Buerkert | H02K 11/0141 |
| 2003/0062780 A1 * | 4/2003 | Kaneko | H02K 3/24 |
| | | | 310/58 |
| 2010/0109491 A1 * | 5/2010 | Miyazaki | H02K 29/12 |
| | | | 310/68 B |
| 2014/0070672 A1 * | 3/2014 | Gale | G01B 7/30 |
| | | | 324/207.16 |
| 2015/0123511 A1 * | 5/2015 | Laskaris | H02K 19/10 |
| | | | 310/216.108 |
| 2018/0183295 A1 * | 6/2018 | Krompasky | H02K 15/022 |
| 2023/0318410 A1 * | 10/2023 | Jöckel | F03D 9/25 |
| | | | 290/55 |
| 2024/0250578 A1 * | 7/2024 | Washino | H02K 7/083 |

FOREIGN PATENT DOCUMENTS

| | | | | |
|---|---|---|---|---|
| DE | 102019127584 A1 * | 4/2021 | | |
| JP | 54-31109 U | 3/1979 | | |
| JP | 2000-197298 A | 7/2000 | | |
| JP | 2000-270507 A | 9/2000 | | |
| JP | 2002-51503 A | 2/2002 | | |
| JP | 2008160909 A * | 7/2008 | | |
| JP | 2014087122 A * | 5/2014 | | |
| WO | WO-2018047515 A1 * | 3/2018 | | H02K 5/20 |

\* cited by examiner

ROTATING ELECTRICAL MACHINE

The present application is based on PCT filing PCT/J2020/JP2020/029492, filed Jul. 31, 2020, the entire contents of which are incorporated herein by reference.

FIELD

The present disclosure relates to a rotating electrical machine driven by a power conversion circuit including an inverter.

BACKGROUND

In a rotating electrical machine driven by a power conversion circuit including an inverter, electrolytic corrosion of a bearing occurs due to switching operations of semiconductor devices included in the inverter. Such electrolytic corrosion causes wear on and damage to the bearing, thereby reducing the reliability of the rotating electrical machine.

Therefore, the conventional rotating electrical machine has been configured to reduce electrolytic corrosion by means of adjusting a stray capacitance distribution inside the rotating electrical machine with use of an electrostatic shield, so as to reduce a shaft voltage generated in the bearing. For example, in Patent Literature 1, an electrostatic shield that is a non-magnetic substance and a metal conductor is disposed to close an opening of a slot of a stator, thereby reducing shaft voltage.

CITATION LIST

Patent Literature

Patent Literature 1: Japanese Patent Application Laid-open No. 2000-270507 (JP2000270507(A))

SUMMARY

Technical Problem

However, in Patent Literature 1, there is a problem in that a rotor and a stator are spatially separated by the electrostatic shield, so that some heat generated in the rotor and the stator stays in a narrow space. As a result, on the rotor side, for example, demagnetization of permanent magnets embedded in the rotor occurs, and the performance of the rotating electrical machine is degraded. In addition, on the stator side, an insulating film is deteriorated, that is, insulation performance is degraded by the temperature rise of stator windings.

The present disclosure has been made in view of the above circumstances, and an object thereof is to provide a rotating electrical machine capable of reducing a shaft voltage and also ensuring better cooling performance.

Solution to Problem

In order to solve the above-mentioned problems and achieve the object, the present disclosure provides a rotating electrical machine comprising: a rotor including a rotating shaft and a rotor core in which a plurality of magnets is embedded and to which the rotating shaft is fixed; a stator including a stator core disposed to face the rotor core, and stator windings wound around the stator core; a pair consisting of a first bearing and a second bearing to support the rotating shaft; a casing fixed to the stator core and connected to the first bearing and the second bearing, the casing housing the rotor and the stator; and an electrostatic shield connected to the casing, wherein the electrostatic shield has a plurality of opening holes by which a space in which the stator is disposed is communicated with a space in which the rotor is disposed.

Advantageous Effects of Invention

The rotating electrical machine of the present disclosure has an advantageous effect that it can reduce a shaft voltage and ensure better cooling performance.

DESCRIPTION OF EMBODIMENTS

Hereinafter, a rotating electrical machine according to embodiments will be described in detail with reference to the drawings.

First Embodiment

Figure 1:
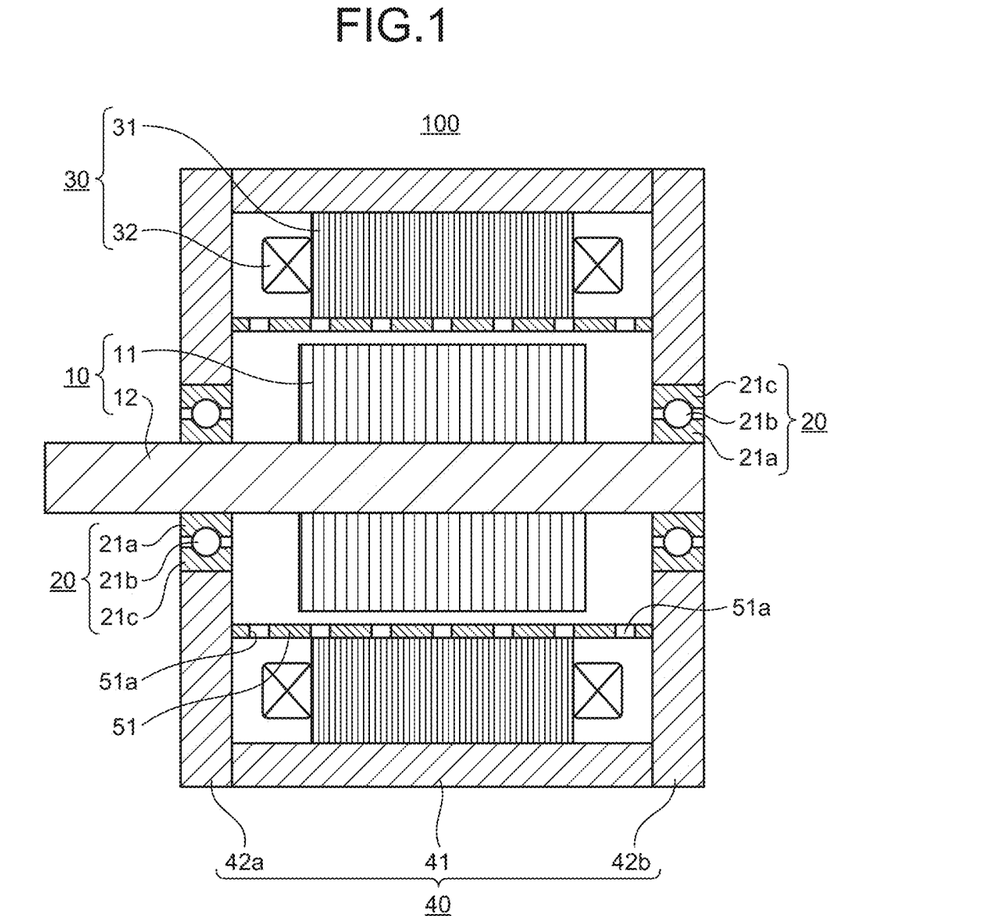
FIG. 1 is a cross-sectional view parallel to the rotation axis of a rotating electrical machine according to a first embodiment.
Figure 2:
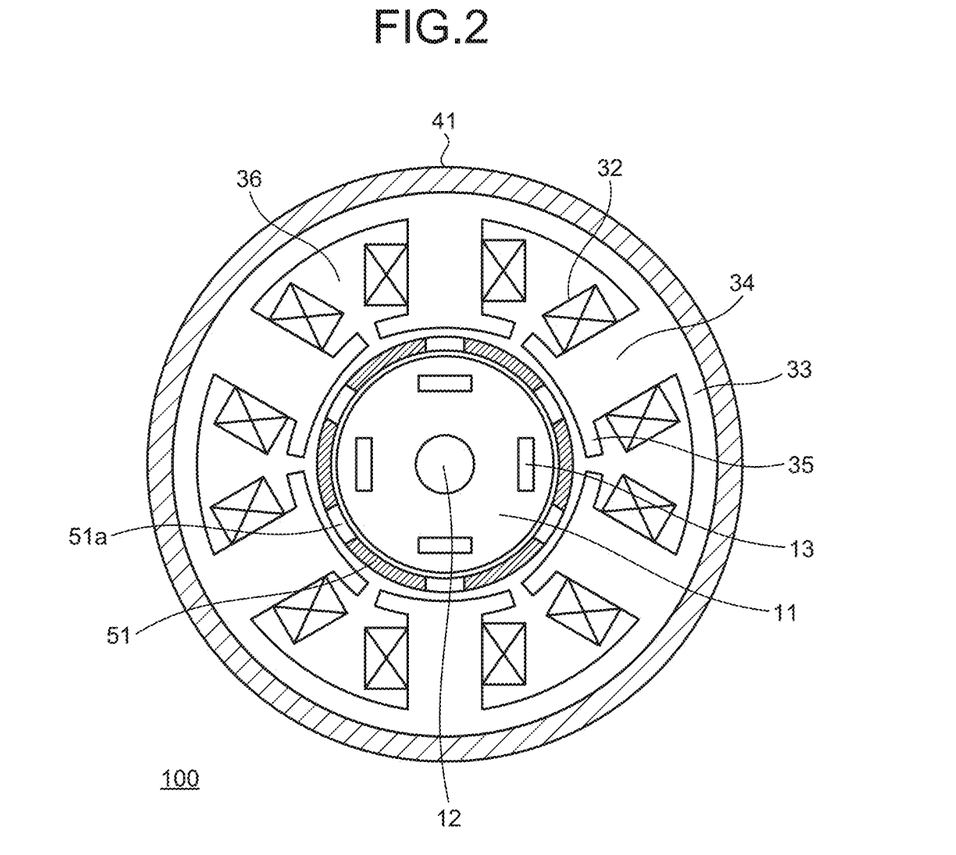
FIG. 2 is a cross-sectional view perpendicular to the rotation axis of the rotating electrical machine according to the first embodiment.

A configuration of a motor 100 that is a rotating electrical machine according to a first embodiment will be described with reference to FIGS. 1 and 2. FIG. 1 is a cross-sectional view taken along a plane parallel to the rotation axis of the motor 100 according to the first embodiment. FIG. 2 is a cross-sectional view taken along a plane perpendicular to the rotation axis of the motor 100 according to the first embodiment.

In FIGS. 1 and 2, the motor 100 has a configuration of a so-called brushless motor. The motor 100 includes a rotor 10, bearings 20, a stator 30, a casing 40, and an electrostatic shield 51. The electrostatic shield 51 has a plurality of opening holes 51a. The electrostatic shield 51 will be described in detail later.

The rotor 10 includes a rotor core 11, a rotating shaft 12, and a plurality of permanent magnets 13. A hole for inserting the rotating shaft 12 is formed in the center of the rotor core 11, while the rotating shaft 12 is fixed coaxially with the hole. The rotor core 11 is electrically conducted to the rotating shaft 12. The rotating shaft 12 is held by a pair of bearings 20 at its load connection side and load non-connection side individually. The rotating shaft 12 is rotatable with respect to the housing 41. The pair of bearings 20 correspond to a first bearing and a second bearing. Each bearing 20 includes an inner ring 21a, a plurality of rigid spheres 21b, and an outer ring 21c. The outer ring 21c is fixed to the housing 41, and the inner ring 21a is fixed to the rotating shaft 12. The plurality of permanent magnets 13 is embedded in the inner part of the rotor core 11. The rotor core 11 is obtained, for example, by stacking thin sheets of electromagnetic steel on top of each other in the rotation axis direction and subjecting them to an integrally forming process.

The stator 30 is composed of a stator core 31 and stator windings 32. The stator core 31 includes an annular core back 33, teeth 34 extending in the radial direction from the inner periphery of the core back 33, and flanges 35 protruding in the circumferential direction from the distal ends of the teeth 34. The radial direction said herein refers to directions perpendicular to the rotating shaft 12 and oriented radially with the rotating shaft 12 being the origin. The circumferential direction said herein refers to directions on a circumference of a concentric circle with the rotating shaft 12 being the origin. The stator core 31 is obtained, for example, by stacking thin sheets of electromagnetic steel on top of each other in the rotation axis direction and subjecting them to an integrally forming process. The stator windings 32 are wound around the teeth 34 and put in slots 36. Of the stator winding 32, a portion protruding from the outermost layer of the stator core 31 is referred to as a coil end portion. Methods of winding the stator windings 32 include a winding method called concentrated winding in which the stator windings 32 are wound around their respective teeth 34, and a winding method called distributed winding in which the stator windings 32 are wound across two or more of the teeth 34. In either winding method, the effects of the embodiment described later can be obtained likewise.

The casing 40 is composed of a housing 41 and brackets 42a and 42b. The brackets 42a and 42b correspond to a first bracket and a second bracket. The housing 41 has a cylindrical shape. The inner peripheral surface of the housing 41 and the outer peripheral surface of the core back 33 of the stator core 31 are fixed to each other in one piece, in such a manner that the inner and outer peripheral surfaces are opposed to each other. The housing 41 is electrically conducted to the core back 33 of the stator core 31. The brackets 42a and 42b are fastened with bolts or the like to both ends of the housing 41, that is, openings on the load connection side and the load non-connection side, respectively. The brackets 42a and 42b are fixed to the outer rings 21c of the bearings 20. The housing 41 and the brackets 42a and 42b made in one piece serve as the casing 40 of the motor 100, in which the rotor 10, the bearings 20, and the stator 30 are housed.

Figure 3:
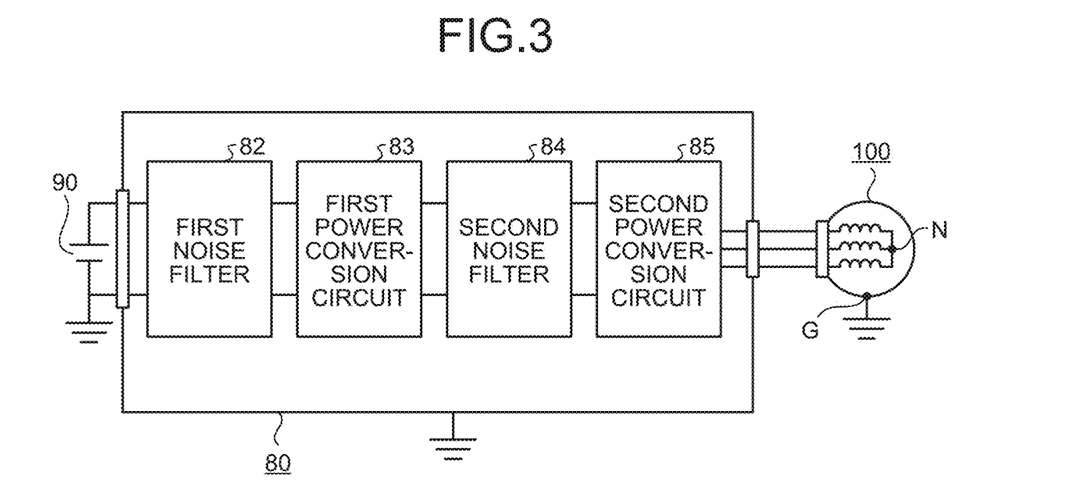
FIG. 3 is a diagram illustrating a configuration of a peripheral circuit of the rotating electrical machine according to the first embodiment.

Next, with reference to FIG. 3, a configuration of a peripheral circuit that drives the motor 100 according to the first embodiment will be described. FIG. 3 is a diagram illustrating the configuration of the peripheral circuit of the motor 100. The peripheral circuit includes an inverter 80, a power supply 90, and wiring lines connecting them.

The power supply 90 is a DC power supply that supplies electric power necessary for driving the motor 100. As the DC power supply, a lithium-ion battery, a nickel hydride battery, or a lead storage battery can be used, for example.

The inverter 80 has a configuration in which a first noise filter 82, a first power conversion circuit 83, a second noise filter 84, and a second power conversion circuit 85 are connected in a cascade arrangement.

The first power conversion circuit 83 includes semiconductor switching elements. For a voltage supplied from the power supply 90 through the first noise filter 82, the first power conversion circuit 83 boosts or steps down the DC voltage supplied from the power supply 90 to a DC voltage having a different voltage value by adjusting the ratio of an ON time length to an OFF time length of the semiconductor switching elements. The first power conversion circuit 83 functions as a so-called converter circuit.

The second power conversion circuit 85 is connected to the first power conversion circuit 83 via the second noise filter 84. The second power conversion circuit 85 includes semiconductor switching elements. The second power conversion circuit 85 receives the DC voltage outputted from the first power conversion circuit 83 as its input, and outputs three-phase AC electric current required to drive the motor 100 by adjusting the ratio of an ON time length to an OFF time length of the switching elements. The second power conversion circuit 85 functions as a so-called inverter circuit.

As the switching elements included in the first power conversion circuit 83 and the second power conversion circuit 85, insulated-gate bipolar transistors (IGBTs), metal-oxide semiconductor field-effect transistors (MOSFETs), or the like can be used, for example.

The first noise filter 82 is provided between the power supply 90 and the first power conversion circuit 83, which is intended to prevent high-frequency noise caused by the switching operation of the semiconductor switching elements of the first power conversion circuit 83 from leaking to the power supply 90 side. The second noise filter 84 is provided between the first power conversion circuit 83 and the second power conversion circuit 85, which is intended to prevent high-frequency noise caused by the switching operation of the semiconductor switching elements in the second power conversion circuit 85 from leaking to the power supply 90 side.

Each of the first noise filter 82 and the second noise filter 84 includes one or more inductors and one or more capacitors. The inductor is inserted in series with the positive side of the power supply 90 of DC power lines. As the inductor, a coil made by a conducting wire wound around a magnetic core such as ferrite can be used, for example. The capacitors include a so-called X capacitor inserted in parallel between the positive side and the negative side of the DC power supply lines, and so-called a Y capacitor inserted in parallel between the positive-side power supply line and a ground GND and between the negative-side power supply line and the ground GND. The ground GND of the first noise filter 82 and the second noise filter 84 refers to a casing for the inverter 80.

The first noise filter 82, the first power conversion circuit 83, the second noise filter 84, and the second power conversion circuit 85 may be mounted on the same electronic substrate, or may be mounted on their respective independent electronic substrates.

The casing of the inverter 80 is made of an electrically conductive metal, and also functions as an electromagnetic noise shield that prevents the penetration of electromagnetic waves from the outside, and prevents electromagnetic waves caused from the first power conversion circuit 83 and the second power conversion circuit 85 from leaking to the outside. The casing for the inverter 80 is formed of, for example, an electrically conductive metal such as aluminum.

The negative side of the power supply 90, the casing of the inverter 80, and the housing 41 of the motor 100 are grounded to one and the same reference conductor.

Although the present embodiment has been described for the configuration using a DC power supply as the power supply 90, the power supply 90 does not need to be a DC power supply, and an AC power supply may be used therefor. In this case, the first power conversion circuit 83 can be replaced with a circuit that receives an AC voltage as its input and converts the AC voltage into DC voltage having a different voltage value.

Next, a configuration of the electrostatic shield 51 will be described with reference to FIGS. 1 and 2. The electrostatic shield 51 has a cylindrical shape coaxial with the rotating shaft 12. The material of the electrostatic shield 51 is desirably metal having non-magnetism and a higher electrical conductivity, which has a composition of, for example, aluminum alloy, copper, or the like.

The electrostatic shield 51 is disposed in a gap formed between the outer peripheral surface of the rotor core 11 and the inner peripheral surface of the stator core 31. One end of the electrostatic shield 51 is electrically connected to the bracket 42a on the load connection side, and the other end is likewise electrically connected to the bracket 42b on the load non-connection side. The electrostatic shield 51 may be fastened to the brackets 42a and 42b with screws or the like, or otherwise may be integrally formed with the brackets 42a and 42b to eliminate a step for the shield 51 to be positioned with respect to the brackets 42a and 42b. In that case, the electrostatic shield 51 is formed of the same material as the the brackets 42a and 42b. Since the brackets 42a and 42b are electrically conducted to the housing 41, one end of the electrostatic shield 51 may be connected to the housing 41. As long as the electrostatic shield 51 is disposed in the gap formed between the outer peripheral surface of the rotor core 11 and the inner peripheral surface of the stator core 31, the electrostatic shield 51 may be in contact with a part of the stator core 31, or may be at a distance from the stator core 31.

The electrostatic shield 51 is provided with a plurality of opening holes 51a penetrating between the rotor 10 side and the stator 30 side, whose configuration allows a cooling medium to freely flow between the rotor 10 side and the stator 30 side. In other words, the opening holes 51a cause a space in which the stator 30 is disposed and another space in which the rotor 10 is disposed to be communicated with each other.

Figure 7:
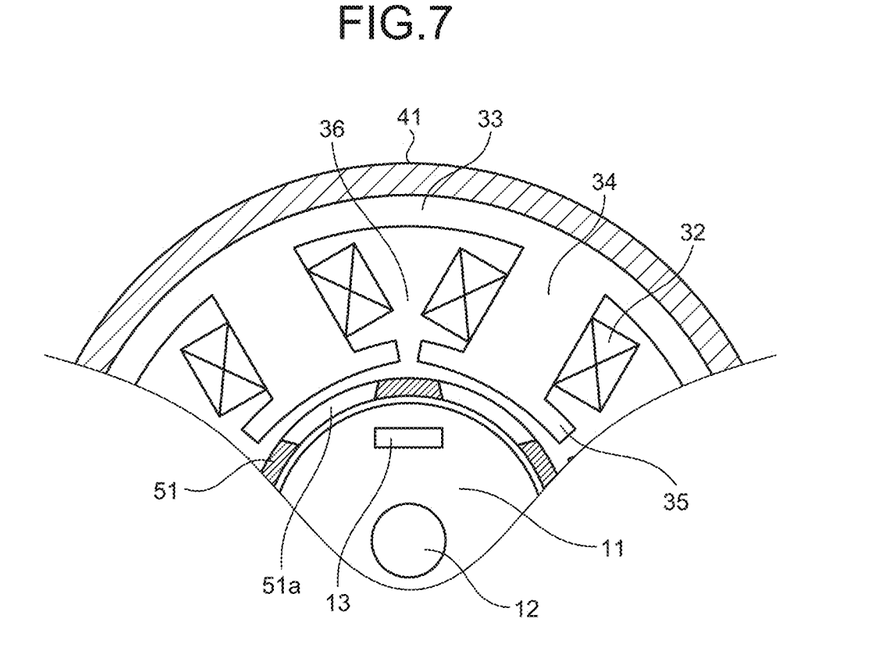
FIG. 7 is an enlarged cross-sectional view illustrating an example of a circumferential arrangement of an electrostatic shield in the rotating electrical machine according to the first embodiment.

An example of a circumferential arrangement of the opening holes 51a will be described with reference to FIGS. 2 and 7. FIG. 7 is an enlarged cross-sectional view illustrating an example of a circumferential arrangement of the electrostatic shield 51. As illustrated in FIGS. 2 and 7, the opening holes 51a are arranged to face the teeth 34 of the stator core 31. The number of the opening holes 51a may be equal to the number of the teeth 34. Alternatively, the opening holes 51a may be arranged to face specified ones of the teeth 34.

Next, the operation of the motor 100 according to the first embodiment will be described. First of all for it, the principle of rotation of the rotor 10 of the motor 100 will be described.

The DC voltage supplied from the power supply 90 is power-converted by the inverter 80, boosted or stepped down to a predetermined voltage, and converted from direct current into three-phase alternating current having a certain frequency. The inverter 80 supplies the three-phase alternating electric current to the stator windings 32 of the motor 100 through three-phase power lines. Magnetic fluxes induced at the individual teeth 34 by the three-phase alternating electric current flowing through the stator windings 32 form one magnetic circuit via the core back 33, and generate a rotating magnetic field. When the three-phase alternating electric current flows through the stator windings 32 and thereby a rotating magnetic field is generated according to the above principle, an electromagnetic force is induced by the rotating magnetic field, and thereby the permanent magnets 13 fitted in the rotor core 11 are subjected to the electromagnetic force, so that the rotor core 11 is rotated. The rotor core 11 is rotatably disposed in a space surrounded by the flanges 35 situated on the inner peripheral side of the stator core 31, while the rotor core 11 and the rotating shaft 12 are fixed to each other. Therefore, a driving force provided by the rotation of the rotor core 11 can be derived to the outside of the motor 100 by connecting a load to the rotating shaft 12. At this time, a gear for converting the rotation ratio may be interposed between the rotating shaft 12 and the load.

Figure 4:
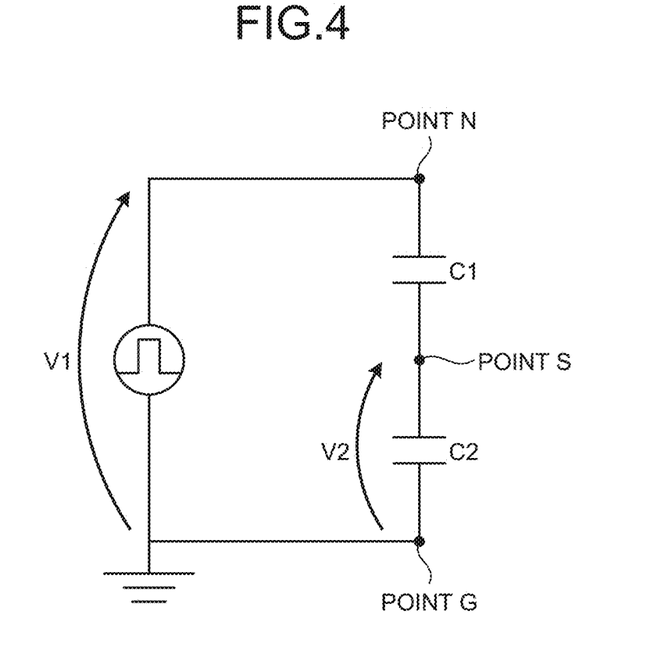
FIG. 4 is an equivalent circuit diagram illustrating the principle of generation of a shaft voltage in the rotating electrical machine according to the first embodiment.

Next, the principle of generation of a shaft voltage in the motor 100 driven by the inverter 80 will be described with reference to FIG. 4. FIG. 4 is an equivalent circuit diagram illustrating the principle of generation of the shaft voltage in the motor 100. Here, a shaft voltage is defined as an electrical potential of the rotating shaft 12 measured relative to an electrical potential of the casing 40. In FIG. 4, a point G represents the electrical potential of the casing 40, a point N represents a neutral point electrical potential of the stator windings 32, and a point S represents the electrical potential of the rotating shaft 12. Here, an electrical potential difference V1 between the points N and G represents a neutral point voltage of the motor 100, and an electrical potential difference V2 between the points S and G represents a shaft voltage of the motor 100. C1 represents stray capacitance between the stator windings 32 and the rotor 10, and C2 represents stray capacitance between the rotor 10 and the casing 40.

To drive the motor 100, a semiconductor switching element group included in the second power conversion circuit 85 performs switching operation at a carrier frequency fc based on PWM control. For this operation, the magnitude of the neutral point voltage V1 also time-varies stepwise in cycles of the carrier frequency fc.

The variation of the neutral point voltage V1 generated between the casing 40 and the stator windings 32 is divided by the stray capacitance C1 and the stray capacitance C2 distributed inside the motor 100, so that a finite electrical potential difference relative to the casing 40, that is, a shaft voltage is induced in the rotating shaft 12.

The impedance Z of stray capacitance C at the frequency f can be expressed by the following formula (1).

$$Z(C)=1/(2\pi fC) \quad (1)$$

Thus, the shaft voltage V2 is expressed by the following formula (2).

$$V2=\{Z(C2)/(Z(C1)+Z(C2))\}\times V1=\{C1/(C1+C2)\}\times V1 \quad (2)$$

Next, the effect of electrostatic shielding between the stator windings 32 and the rotor 10 will be described. When electrostatic shielding is not performed, the shaft voltage V2 is applied between the inner ring 21a and the outer ring 21c of the bearing 20. When the shaft voltage V2 exceeds the dielectric breakdown voltage value of a lubricating oil applied to the rigid spheres 21b, an inrush current flows between the inner ring 21a and the outer ring 21c, and so wear on and damage to the bearing called electrolytic corrosion is caused. Such wear and damage significantly reduce the reliability of the motor. If damage due to electrolytic corrosion is significant, the bearing needs to be replaced. To reduce the generation of such a shaft voltage, formula (2) shows that it is sufficient to adjust the capacity ratio between C1 and C2, and, in particular, making the magnitude of C1 sufficiently small as compared to C2 can reduce the amount of generation of the shaft voltage V2.

Since C1 is the stray capacitance between the stator windings 32 and the rotor 10, electrostatic shielding can be provided between the stator windings 32 and the rotor 10 so as to reduce the magnitude of C1.

Furthermore, the performance degradation of the motor 100 due to a temperature rise caused by heat generation inside the casing 40 of the motor 100 will be described. Increasing the output of the motor 100 or reducing the size of the casing 40 is industrially important, but these are accompanied by a temperature rise inside the casing 40. As a result, the temperature of the permanent magnets 13 embedded in the rotor core 11 increases, the magnetic coercive force of the permanent magnets 13 decreases, and the performance of the motor 100 is greatly degraded. Further, the insulating coatings on the stator windings 32 are degraded in insulation performance due to the temperature rise. In either case, the temperature rise causes degradation in the reliability of the motor 100, thereby resulting in the performance of the motor 100 being significantly limited.

As described above, in order to obtain a motor having high reliability and meeting higher output and smaller size, it is required to reduce a temperature rise inside the casing while reducing occurrence of electrolytic corrosion due to the shaft voltage.

Next, the effect of the electrostatic shield 51 will be described. As described with reference to FIG. 4 and formula (2), the shaft voltage V2 is a voltage generated in the rotating shaft 12 by the division of the neutral point voltage V1 generated in the stator windings 32, according to the stray capacitance distribution inside the casing 40. The shaft voltage V2 can be reduced by the electrostatic shielding provided between the stator windings 32 and the rotor 10.

As described above, the electrostatic shield 51 has a cylindrical shape and is disposed in the gap between the rotor core 11 and the stator core 31 as illustrated in FIG. 1. The opposed ends of the electrostatic shield 51 are electrically connected to the brackets 42a and 42b, respectively. The electrostatic shield 51 is a conductor having the same electrical potential as the casing 40, and thus has the effect of shielding against capacitive coupling between the stator windings 32 and the rotor 10, that is, electrostatic shielding. This can make the stray capacitance C1 generated between the stator windings 32 and the rotor 10 relatively small with respect to the stray capacitance C2, and resultantly, it is possible to reduce the shaft voltage V2 subjected to voltage dividing in the rotating shaft according to formula (2).

Figure 5:
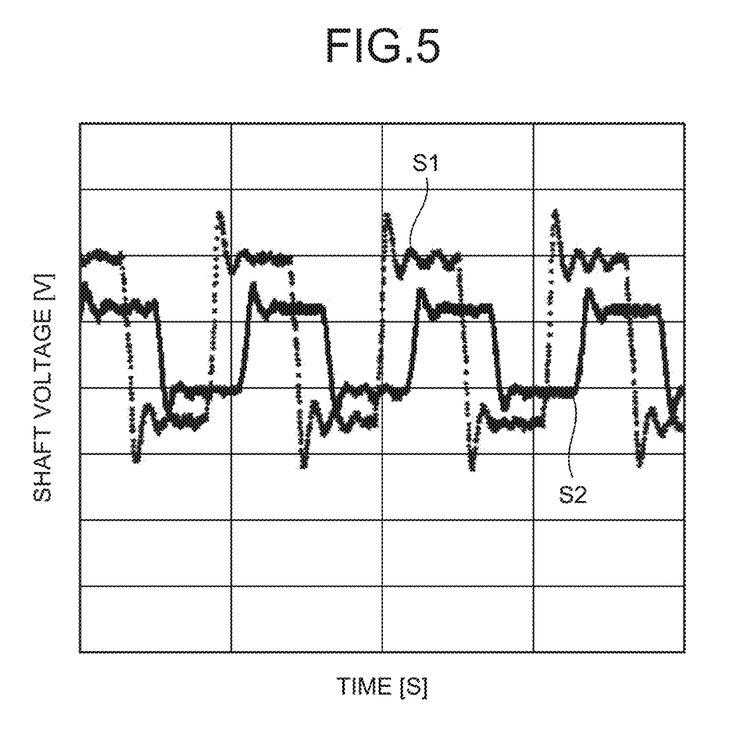
FIG. 5 is a diagram illustrating time waveforms of a shaft voltage in the rotating electrical machine according to the first embodiment.

FIG. 5 is a diagram illustrating actual measurement results of time waveforms of a shaft voltage for verifying the shielding effect of the electrostatic shield 51. A line indicated by a reference numeral S1 shows a state with no electrostatic shield, and a line indicated by a reference numeral S2 shows a state with the electrostatic shield 51 being present. In FIG. 5, the electrical potential of the rotating shaft 12 is depicted as a shaft voltage with using the casing 40 as a reference electrical potential. As can be seen from FIG. 5, the provision of the electrostatic shield 51 can reduce the shaft voltage observed.

Figure 6:
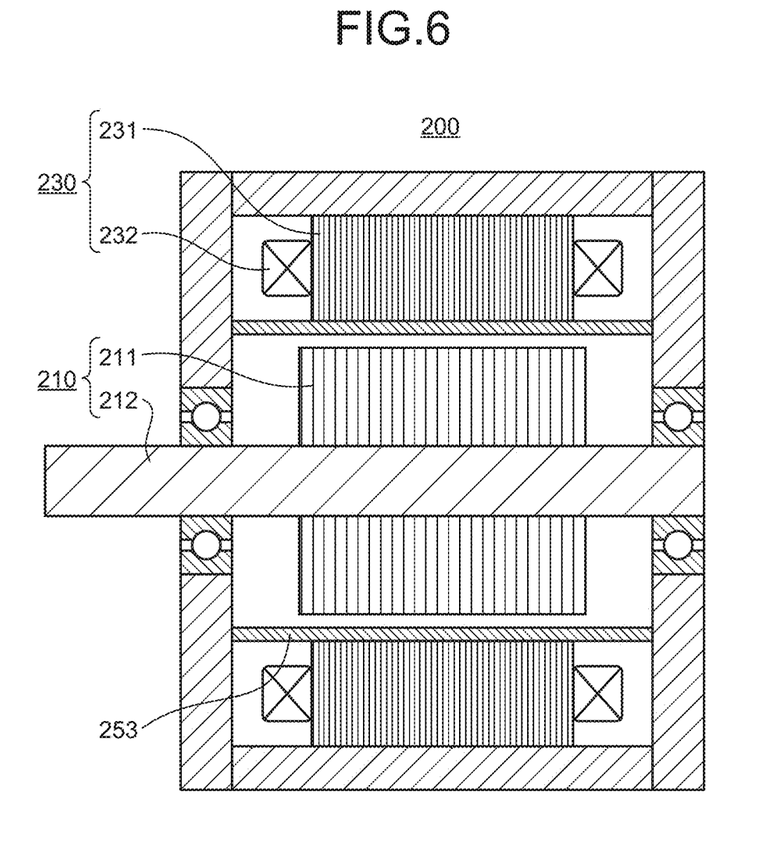
FIG. 6 is a diagram illustrating a rotating electrical machine of a comparative example.

Next, the effect of cooling as a result of the electrostatic shield 51 being provided with the opening holes 51a in the first embodiment will be described in comparison with a configuration of a comparative example. FIG. 6 is a diagram illustrating a motor 200 of the comparative example. As illustrated in FIG. 6, the motor 200 of the comparative example includes: a rotor 210 including a rotor core 211 and a rotating shaft 212; a stator 230 including a stator core 231 and stator windings 232; and an electrostatic shield 253 having no opening hole. For the purpose of reducing a shaft voltage, the electrostatic shield 253 has performed electrostatic shielding between the stator 230 and the rotor 210, using an electrically conductive member as a partition wall. However, in that configuration, the stator 230 and the rotor 210 are spatially separated, so that heat generated in each of the stator 230 and the rotor 210 stays in its separate space, and the temperature gradient is limited by the efficiency of heat exchange of the conductor wall. As a result, on the rotor 210 side, for example, a temperature rise causes the demagnetization of a permanent magnet embedded in the rotor 210, and degradation of the performance of the motor 200. Also on the stator 230 side, a temperature rise causes the deterioration of insulating coatings on the stator windings 232, leading to the degradation of insulation performance, and eventually, the degradation of the reliability of the motor 200.

On the other hand, the electrostatic shield 51 included in the motor 100 according to the first embodiment includes the opening holes 51a in a cylindrical wall thereof. The opening holes 51a penetrate between the inner peripheral surface and the outer peripheral surface of the electrostatic shield 51, and allows the cooling medium to freely flow through between the rotor 10 side and the stator 30 side. This achieves heat exchange using the cooling medium in addition to heat exchange through the conductor wall, thereby making it possible to efficiently cool the rotor 10 and the stator 30. As the cooling medium in the configuration of the motor 100, air cooling using air is possible.

FIG. 7 is an enlarged cross-sectional view illustrating an example of a circumferential arrangement of the electrostatic shield 51 in the motor 100. As illustrated in FIG. 7, the opening holes 51a are arranged to face the teeth 34 of the stator 30 in the circumferential direction, thereby allowing the cooling medium to be selectively guided to the teeth 34. This enables more direct cooling of the teeth 34 and the coil end portions of the stator windings 32.

Figure 8:
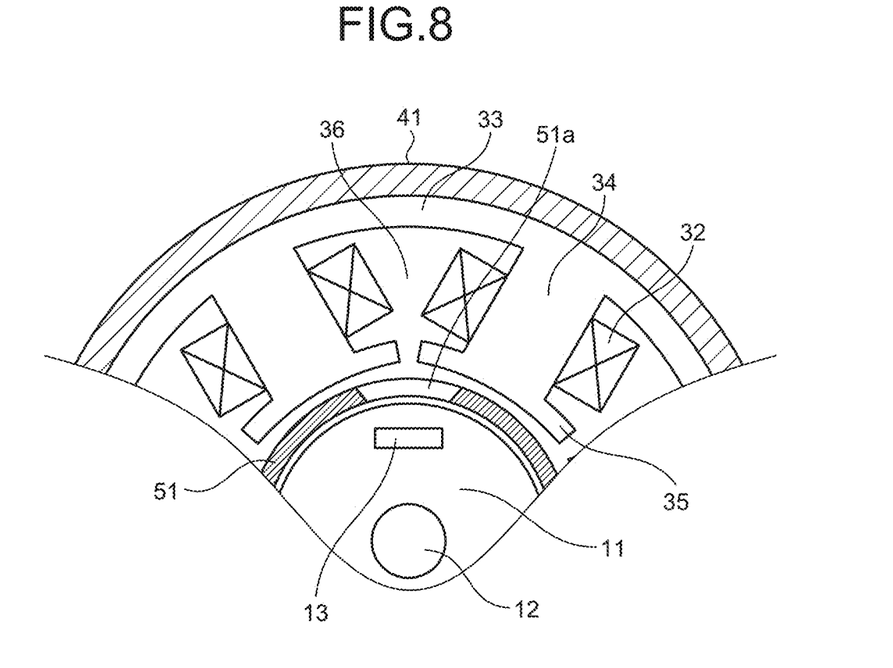
FIG. 8 is an enlarged cross-sectional view illustrating another example of a circumferential arrangement of the electrostatic shield in the rotating electrical machine according to the first embodiment.

FIG. 8 is an enlarged cross-sectional view illustrating another example of a circumferential arrangement of the electrostatic shield 51 in the motor 100. As another circumferential arrangement, as illustrated in FIG. 8, the opening hole 51a is arranged to face the slot 36 of the stator 30, thereby allowing the cooling medium to be selectively guided to the slot 36. This enables more direct cooling of the slots 36 and portions of the stator windings 32 put in the slots 36.

Figure 9:
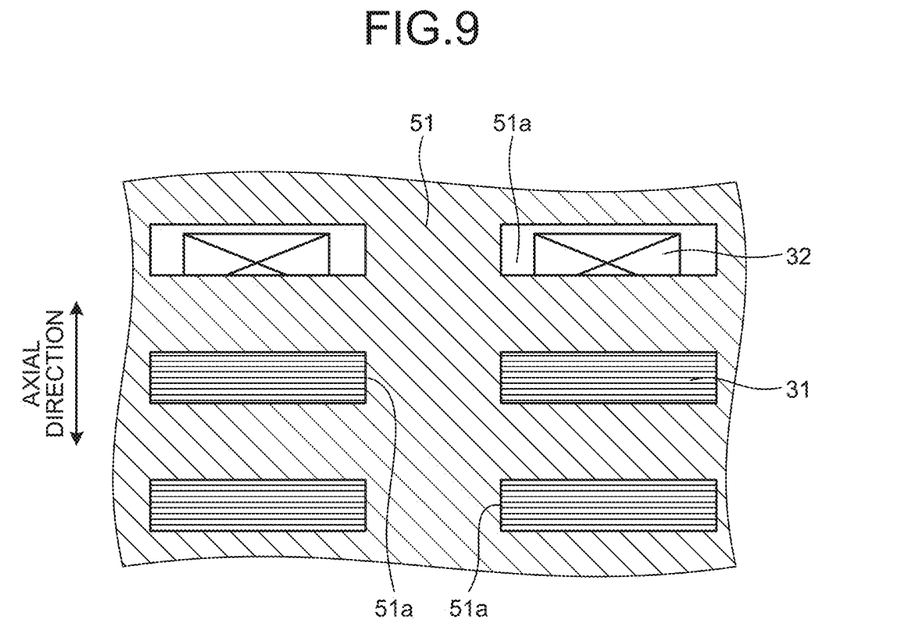
FIG. 9 is an enlarged cross-sectional view illustrating an example of an axial arrangement of the electrostatic shield in the rotating electrical machine according to the first embodiment.

FIG. 9 is an enlarged cross-sectional view illustrating an example of an axial arrangement of the electrostatic shield 51 in the motor 100, and is a diagram illustrating the axial positional relationship between the opening holes 51a of the electrostatic shield 51 and the stator 30. The opening holes 51a of the electrostatic shield 51 are intermittently provided along the axial direction. Some opening holes 51a are arranged to face the coil end portions of the stator windings 32 as illustrated in FIG. 9, thereby allowing the cooling medium to be selectively guided to the coil end portions. This enables more direct cooling of the coil end portions.

The shape of the opening holes 51a described above may be a rectangular shape or an elliptical shape. An opening area of the opening hole 51a on the rotor 10 side may be different from an opening area of the opening hole 51a on the stator 30 side. That is, the radial cross-sectional shape of the opening holes 51a does not have to be uniform. The same applies to the circumferential cross-sectional shape thereof.

As described above, according to the first embodiment, the electrostatic shield 51 has the opening holes 51a, and therefore it is possible to provide the motor 100 capable of cooling the rotor 10 and the stator 30 while reducing the shaft voltage.

Second Embodiment

Figure 10:
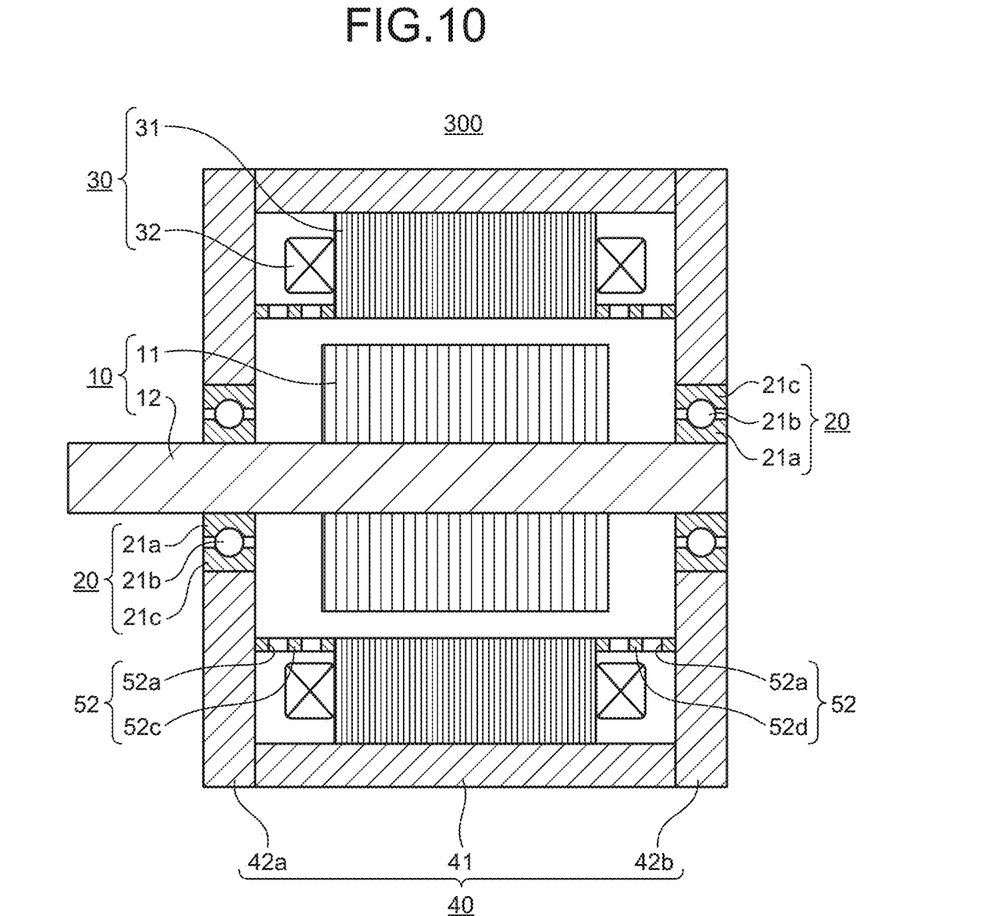
FIG. 10 is a cross-sectional view parallel to the rotation axis of a rotating electrical machine according to a second embodiment.
Figure 11:
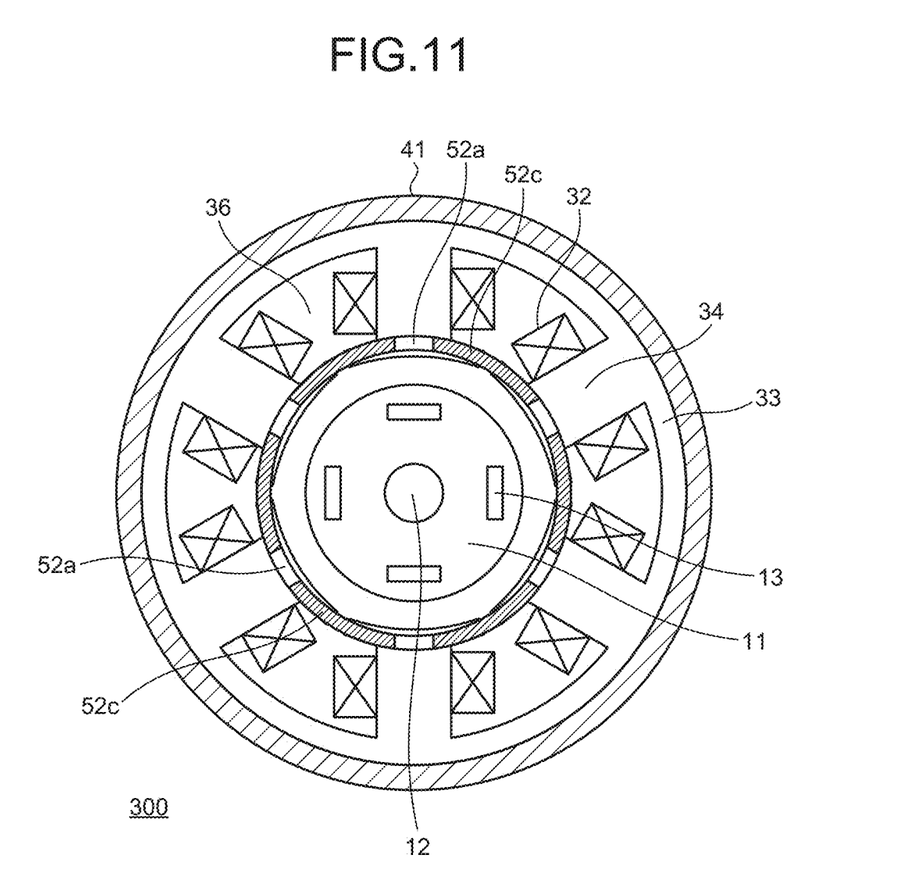
FIG. 11 is a cross-sectional view perpendicular to the rotation axis of the rotating electrical machine according to the second embodiment.

A configuration of a motor 300 according to a second embodiment will be described with reference to FIGS. 10 and 11. FIG. 10 is a cross-sectional view taken along a plane parallel to the rotation axis of the motor 300 according to the second embodiment. FIG. 11 is a cross-sectional view taken along a plane perpendicular to the rotation axis of the motor 300 according to the second embodiment.

In the second embodiment, an electrostatic shield 52 does not isolate a space between the stator core 31 and the rotor 10. The electrostatic shield 52 is composed of a first electrostatic shield 52c and a second electrostatic shield 52d. The first electrostatic shield 52c is disposed to connect an outermost layer of the stator core 31 and the bracket 42a. The second electrostatic shield 52d is disposed to connect an outermost layer of the stator core 31 and the bracket 42b. Each of the first electrostatic shield 52c and the second electrostatic shield 52d includes a plurality of opening holes 52a by which the rotor 10 side is communicated with the stator 30 side. As the circumferential arrangement positions of the opening holes 52a, either pattern of the positions illustrated in FIGS. 7 and 8 may be adopted. As the axial arrangement positions of the opening holes 52a, the positions illustrated in FIG. 9 may be adopted. Since the brackets 42a and 42b are electrically conducted to the housing 41, one end of each of the first electrostatic shield 52c and the second electrostatic shield 52d may be connected to the housing 41.

In the second embodiment like this, the electrostatic shield 52 is a conductor having the same electrical potential as the casing 40, and thus shields against capacitive coupling between the coil end portions of the stator windings 32 and the rotor 10. This can make the stray capacitance C1 caused between the stator windings 32 and the rotor 10 relatively small with respect to the stray capacitance C2, and resultantly, can reduce the shaft voltage V2 subjected to voltage dividing in the rotating shaft according to formula (2).

Further, in the second embodiment, the stator core 31 is not isolated from the space on the rotor 10 side, thereby leading to an advantageous configuration in terms of cooling.

For portions of the outermost layers of the stator core 31 connected to the first electrostatic shield 52c and the second electrostatic shield 52d, the insulating coating on the stator core 31 is partially removed to allow the removed-coating part of the core 31 to be in electrical contact with the first electrostatic shield 52c and the second electrostatic shield 52d, so that a more effective electrostatic shielding effect can be obtained.

Note that the first electrostatic shield 52c and the second electrostatic shield 52d do not necessarily need to be fixed to the outermost layers of the stator core 31, and may be provided with a recessed portion comparable in depth to that of the opening holes 52a and fixed to inner layers of the stator core 31. Alternatively, a stretchable member such as an electrically conductive gasket may be used to bring the second electrostatic shield 52d into contact with the stator core 31. Such a configuration using the member has the effect of buffering impact to the electrostatic shield 52, caused by the vibration of the motor 300. In addition, a manufacturing tolerance and a tolerance caused at the time of assembly are absorbed, and so the configuration has the effect of improving the ease of assembly of the motor 300.

As described above, according to the second embodiment, the stator core 31 is not isolated from the space on the rotor 10 side, thus leading to a more advantageous configuration in terms of cooling than the first embodiment.

Third Embodiment

Figure 12:
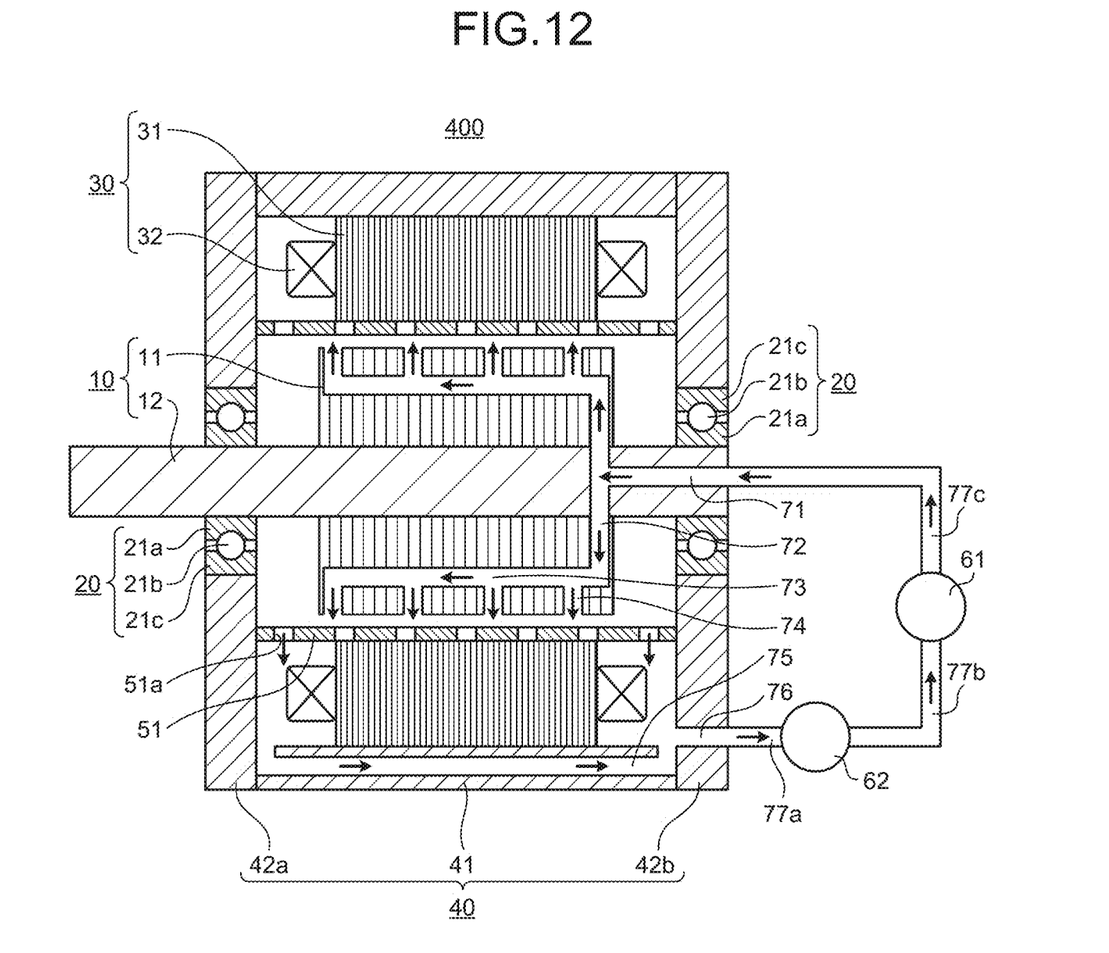
FIG. 12 is a cross-sectional view parallel to the rotation axis of a rotating electrical machine according to a third embodiment.

A configuration of a motor 400 according to a third embodiment will be described with reference to FIG. 12. FIG. 12 is a cross-sectional view taken along a plane parallel to the rotation axis of the motor 400 according to the third embodiment.

The motor 400 further includes cooling medium paths 71 to 77, a pump 61, and a heat exchanger 62 in addition to the configuration of the motor 100 according to the first embodiment.

Description is given for portions related to a route through which the cooling medium for cooling the rotor 10 and the stator 30 passes, that is, a cooling medium path. The rotor 10 has the cooling medium paths 71, 72, 73, and 74. The cooling medium path 71 is a hole provided in the load non-connection side of the rotating shaft 12 and extending in the axial length direction of the rotating shaft 12, the hole forming an opening as a cooling medium supply hole on the load non-connection side. The cooling medium path 72 is a hole communicating with the cooling medium path 71 and radially extending in the circumferential direction of the rotor core 11. The cooling medium path 73 is a hole communicating with the cooling medium path 72 and extending in the axial length direction of the rotor core 11. The cooling medium paths 74 are holes communicating with the cooling medium paths 73 and extending radially in the circumferential direction of the rotor core 11, and have openings in the outer peripheral portion of the rotor core 11. The cooling medium paths 74 are provided at a plurality of locations in the axial direction in the rotor core 11. These cooling medium paths 71, 72, 73, and 74 communicate with each other and form a cooling medium path from the opening provided in the load non-connection side of the rotating shaft 12 to the openings in the outer peripheral portion of the rotor core 11.

The casing 40 has the cooling medium paths 75 and 76. The cooling medium path 75 is a hole provided in the housing 41 and has openings situated near a coil end portion on the load connection side and a coil end portion on the load non-connection side, respectively. The cooling medium path 76 is a hole as a cooling medium discharge hole provided in the bracket 42b on the load non-connection side.

Pipes 77a, 77b, and 77c as the cooling medium path 77, the pump 61, and the heat exchanger 62 are provided outside the motor 400. The pipe 77a communicates with the cooling medium path 76 and is connected to the heat exchanger 62. The pipe 77b connects the heat exchanger 62 and the pump 61. The pipe 77c is connected to the pump and communicates with the cooling medium path 71.

The operation of the motor 400 according to the third embodiment will be described. The cooling medium driven by the pump 61 passes through the pipe 77c, and is supplied to the cooling medium path 71 having the cooling medium supply hole. The cooling medium passes through the cooling medium paths 71, 72, 73, and 74 communicating with each other. The cooling medium is sprayed toward the electrostatic shield 51 by centrifugal force generated by the rotation of the rotor 10 in addition to the driving force of the pump from the opening provided in the rotor core 11 toward the stator 30. The cooling medium passes through the opening holes 51a provided in the electrostatic shield 51, thereby being guided to the stator core 31 and the stator windings 32. The cooling medium dropped from the stator 30 passes through the opening holes 51a again, and is finally discharged through the cooling medium path 75 to the outside of the casing 40 from a cooling medium outlet provided in the cooling medium path 76. The discharged cooling medium is sent into the heat exchanger 62 through the pipe 77a. The heat exchanger 62 lowers the heat of the cooling medium whose temperature has risen inside the casing 40, and supplies the cooled cooling medium to the pump 61 again through the pipe 77b.

Next, the effects of the motor 400 according to the third embodiment will be described. The cooling medium exchanges heat with the rotor core 11 and the permanent magnets 13 during the process of the cooling medium passing through the cooling medium paths 71, 72, 73, and 74 provided in the rotor 10. In this way, the cooling medium takes the heat from the rotor core 11 and the permanent magnets 13, so that the temperature rise of the rotor core 11 and the permanent magnets 13 can be reduced. In particular, by the electrostatic shield 51 having the opening holes 51a, the cooling medium can be allowed to flow through to the stator 30 side. Consequently, the cooling medium exchanges heat with the stator windings 32, and the cooling medium takes the heat from the stator windings 32, so that the temperature rise of the stator windings 32 can be reduced. Since the heat taken by the cooling medium is discharged to the outside of the motor 400 at the heat exchanger 62, the motor 400 of the present embodiment can efficiently reduce the temperature rise of the rotor 10 and the stator 30 using the cooling medium while reducing the shaft voltage. As the cooling medium, insulating oil or air can be used, for example.

For a circumferential arrangement of the opening holes 51a, when the opening holes 51a are provided to face the teeth 34 as illustrated in FIG. 7, the cooling medium can be selectively guided to the teeth 34. This enables more direct cooling of the teeth 34 and the coil end portions of the stator windings 32.

For another circumferential arrangement of the opening holes 51a, when the opening holes 51a are provided to face the slots 36 as illustrated in FIG. 8, the cooling medium can be selectively guided to the slots 36. This enables more direct cooling of the slots 36 and portions of the stator windings 32 put in the slots 36.

Further, for an axial arrangement of the opening holes 51a, when the openings are provided to face the coil end portions as illustrated in FIG. 9, the cooling medium can be selectively guided to the coil end portions. This enables more direct cooling of the coil end portions.

As described above, according to the third embodiment, the motor 400 has the cooling medium paths 71 to 77 for circulating the cooling medium in the inside thereof, and the opening holes 51a provided in the electrostatic shield 51 form a part of a cooling medium path, thereby making it possible to provide the motor 400 capable of efficiently cooling the rotor 10 and the stator 30 while reducing the shaft voltage.

Fourth Embodiment

Figure 13:
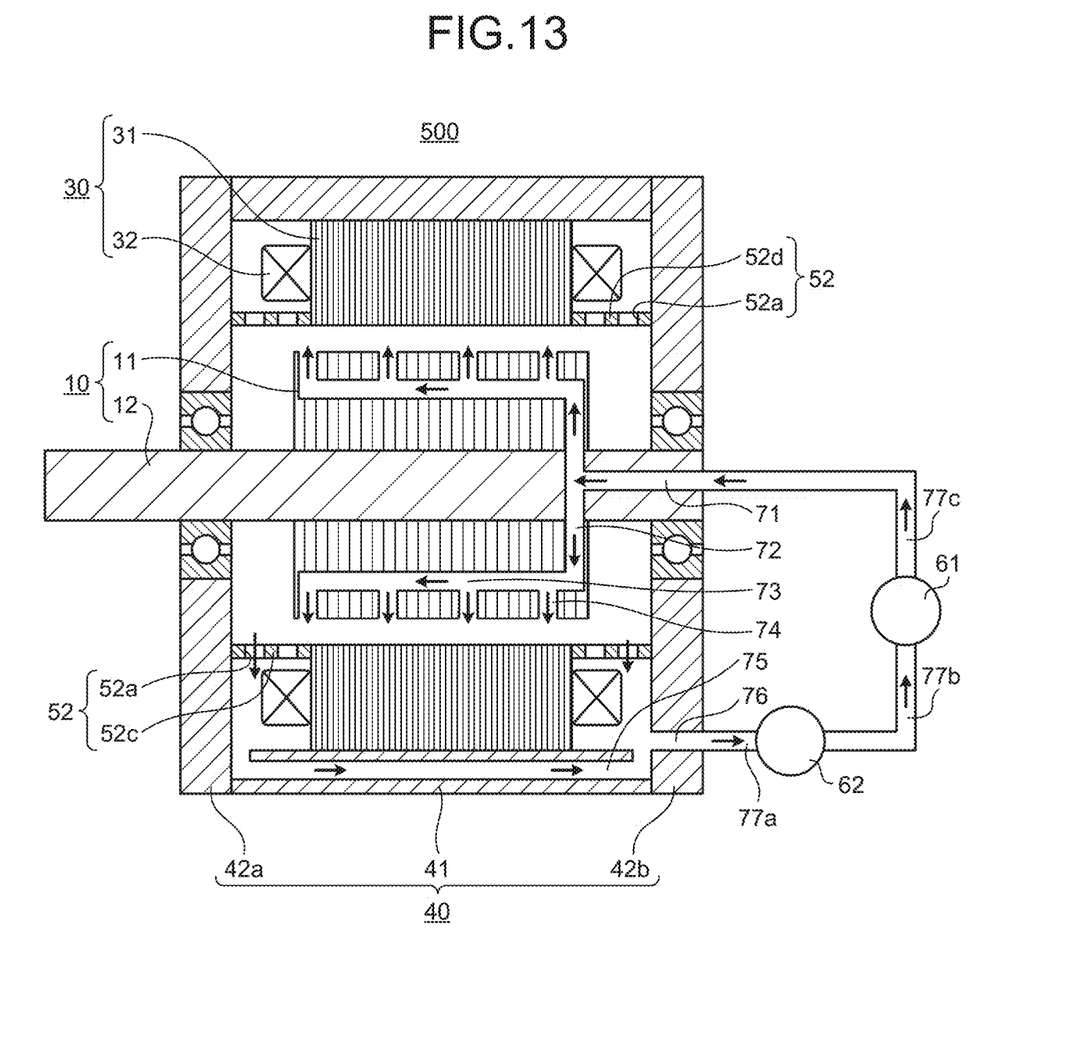
FIG. 13 is a cross-sectional view parallel to the rotation axis of a rotating electrical machine according to a fourth embodiment.

A configuration of a motor 500 according to a fourth embodiment will be described with reference to FIG. 13. FIG. 13 is a cross-sectional view taken along a plane parallel to the rotation axis of the motor 500 according to the fourth embodiment. The motor 500 further includes the cooling medium paths 71 to 77, the pump 61, and the heat exchanger 62 in addition to the configuration of the motor 300 according to the second embodiment.

Having this configuration enables the stator core 31 to be directly cooled by the cooling medium. This can achieve more efficient cooling performance. On the other hand, the coil end portions are electrostatically shielded by the electrostatic shield 52, so that the shaft voltage can also be reduced.

As described above, according to the fourth embodiment, the motor 500 has the cooling medium paths 71 to 77 for circulating the cooling medium in the inside thereof, and the opening holes 52a provided in the electrostatic shield 52 form a part of a cooling medium path, thereby making it possible to provide the motor 500 capable of efficiently cooling the rotor 10 and the stator 30 while reducing the shaft voltage.

The configurations described in the above embodiments illustrate just examples of the contents of the present disclosure, each of which can be combined with other publicly known arts, and can be partly omitted and/or modified without departing from the scope of the present disclosure.

REFERENCE SIGNS LIST 10 rotor; 11 rotor core; 12 rotating shaft; 13 permanent magnet; 20 bearing; 30 stator; 31 stator core; 32 stator winding; 33 core back; 34 teeth; 35 flange; 36 slot; 40 casing; 41 housing; 42a, 42b bracket; 51, 52 electrostatic shield; 51a, 52a opening hole; 61 pump; 62 heat exchanger; 71 to 77 cooling medium path; 80 inverter; 82 first noise filter; 83 first power conversion circuit; 84 second noise filter; 85 second power conversion circuit; 90 power supply; 100, 200, 300, 400, 500 motor.

The invention claimed is:
1. A rotating electrical machine comprising:
a rotor including a rotating shaft and a rotor core in which a plurality of magnets is embedded and to which the rotating shaft is fixed;
a stator including a stator core disposed to face the rotor core, and stator windings wound around the stator core;

a pair consisting of a first bearing and a second bearing to support the rotating shaft;
a casing fixed to the stator core and connected to the first bearing and the second bearing, the casing housing the rotor and the stator; and
an electrostatic shield connected to the casing,
wherein the casing includes a cylindrical housing fixed to the stator core, a first bracket to connect one end of the housing and the first bearing, and a second bracket to connect another end of the housing and the second bearing,
the electrostatic shield includes a first electrostatic shield and a second electrostatic shield,
one end of the first electrostatic shield is connected to the first bracket, and an opposite end of the first electrostatic shield is connected to the stator core,
one end of the second electrostatic shield is connected to the second bracket, and an opposite end of the second electrostatic shield is connected to the stator core, and
the first electrostatic shield and the second electrostatic shield have a plurality of opening holes by which a space in which the stator is disposed is communicated with a space in which the rotor is disposed.

2. The rotating electrical machine according to claim 1, wherein the opening holes are arranged to face teeth of the stator in a circumferential direction of the rotor.

3. The rotating electrical machine according to claim 1, wherein the opening holes are arranged to face slots of the stator in a circumferential direction of the rotor.

4. The rotating electrical machine according to claim 1, wherein the opening holes are arranged to face coil end portions of the stator windings of the stator in an axial direction of the rotating shaft.

5. The rotating electrical machine according to claim 1, wherein
the rotating shaft includes a first cooling medium path through which a cooling medium flows, and the rotor includes a second cooling medium path through which the cooling medium flows, and
the cooling medium can flow through the first cooling medium path, the second cooling medium path, and the opening holes to the stator windings.

6. The rotating electrical machine according to claim 2, wherein
the rotating shaft includes a first cooling medium path through which a cooling medium flows, and the rotor includes a second cooling medium path through which the cooling medium flows, and
the cooling medium can flow through the first cooling medium path, the second cooling medium path, and the opening holes to the stator windings.

7. The rotating electrical machine according to claim 3, wherein
the rotating shaft includes a first cooling medium path through which a cooling medium flows, and the rotor includes a second cooling medium path through which the cooling medium flows, and
the cooling medium can flow through the first cooling medium path, the second cooling medium path, and the opening holes to the stator windings.

8. The rotating electrical machine according to claim 4, wherein
the rotating shaft includes a first cooling medium path through which a cooling medium flows, and the rotor includes a second cooling medium path through which the cooling medium flows, and
the cooling medium can flow through the first cooling medium path, the second cooling medium path, and the opening holes to the stator windings.

* * * * *